US007673806B2

(12) United States Patent
Alasia et al.

(10) Patent No.: US 7,673,806 B2
(45) Date of Patent: Mar. 9, 2010

(54) OBJECT AUTHENTICATION USING HIDDEN IMAGES

(75) Inventors: Alfred V. Alasia, Lake Worth, FL (US); Alfred J. Alasia, Royal Palm Beach, FL (US); Thomas C. Alasia, Lake Worth, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 667 days.

(21) Appl. No.: 11/340,924

(22) Filed: Jan. 27, 2006

(65) Prior Publication Data

US 2006/0119097 A1 Jun. 8, 2006

Related U.S. Application Data

(63) Continuation of application No. 11/108,444, filed on Apr. 18, 2005, now Pat. No. 7,341,200, which is a continuation of application No. 09/267,420, filed on Mar. 11, 1999, now Pat. No. 7,114,750, which is a continuation-in-part of application No. 09/005,736, filed on Jan. 12, 1998, now Pat. No. 6,859,534, which is a continuation-in-part of application No. 08/564,664, filed on Nov. 29, 1995, now Pat. No. 5,708,717.

(51) Int. Cl.
*G06K 5/00* (2006.01)
*G06K 19/06* (2006.01)

(52) U.S. Cl. .................. 235/492; 235/494; 235/462.01

(58) Field of Classification Search ................ 235/488, 235/492, 493, 486, 487, 454, 455, 494, 462.01
See application file for complete search history.

(56) References Cited

U.S. PATENT DOCUMENTS

| | | | | |
|---|---|---|---|---|
| 3,515,452 | A * | 6/1970 | Pole | 359/23 |
| 4,973,087 | A * | 11/1990 | Balogh | 283/62 |
| 5,169,707 | A * | 12/1992 | Faykish et al. | 428/195.1 |
| 5,215,334 | A * | 6/1993 | Presson et al. | 283/76 |
| 5,364,274 | A * | 11/1994 | Sekiguchi | 434/365 |
| 5,494,445 | A * | 2/1996 | Sekiguchi et al. | 434/365 |
| 5,499,116 | A * | 3/1996 | Wreede et al. | 359/2 |
| 5,759,420 | A * | 6/1998 | Minnetian et al. | 216/24 |
| 5,762,378 | A * | 6/1998 | Phillips | 283/72 |
| 5,781,316 | A * | 7/1998 | Strahl et al. | 359/3 |
| 6,070,724 | A * | 6/2000 | McCool | 206/352 |
| 6,390,372 | B1 * | 5/2002 | Waters | 235/487 |
| 6,824,061 | B1 * | 11/2004 | Hattersley et al. | 235/472.01 |
| 2001/0000741 | A1 | 5/2001 | Pinchen et al. | |
| 2005/0243305 | A1 * | 11/2005 | Vig et al. | 356/71 |
| 2006/0225318 | A1 * | 10/2006 | Wilcoxen | 40/124.08 |

* cited by examiner

*Primary Examiner*—Thien M Le
(74) *Attorney, Agent, or Firm*—Hunton & Williams LLP

(57) ABSTRACT

The present invention provides a method of authenticating an article having a hidden image printed on a surface thereof, wherein the image can only be detected when viewed through an optical device.

30 Claims, 15 Drawing Sheets

Elements of the S.I. Image are Flipped.

Enlarged 400%

(A)

Elements of the S.I. Image are *not* Flipped.

Enlarged 400%

(B)

Two phase SI

The method is similar to that of the One Phase SI, but the width of the slice is half of the One Phase SI. Every odd slice input is 'source one' file, every even slice is 'source two' file

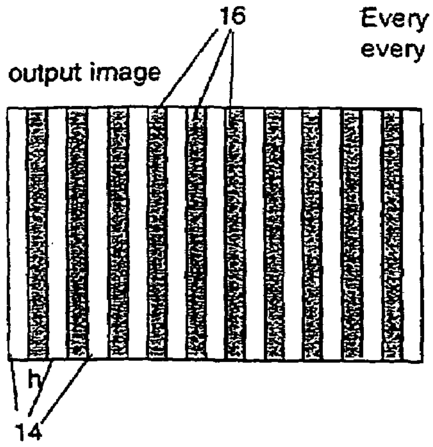

*Fig. 3*

The process inside slice is the same to that of the One Phase SI.

Three Phase SI

The method is similar to that of the Two Phase SI, but the width of slice is one third of the One Phase SI. Every third slice input is the same.

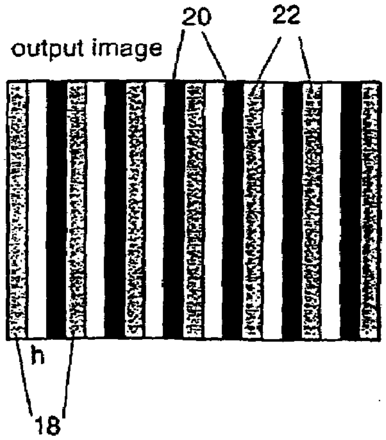

*Fig. 4*

The inside slice process is the same as that of the One Phase SI.

One Phase

TwoPhase

Three Phase 2 phase 10° | 2 phase 20° | 2 phase 30°

2 phase 40° | 2 phase 50° | 2 phase 60°

2 phase 70° | 2 phase 80° | 2 phase 90°

FOLDED

OBJECT AUTHENTICATION USING HIDDEN IMAGES

CROSS-REFERENCE TO RELATED APPLICATIONS

This application is a continuation of U.S. application Ser. No. 11/108,444, filed Apr. 18, 2005, now U.S. Pat. No. 7,341, 200 which is a continuation of U.S. application Ser. No. 09/267,420, filed Mar. 11, 1999 now U.S. Pat. No. 7,114,750, which is a continuation-in-part of U.S. application Ser. No. 09/005,736, filed Jan. 12, 1998, now U.S. Pat. No. 6,859,534, which is a continuation-in-part of U.S. application Ser. No. 08/564,664, filed Nov. 29, 1995, now U.S. Pat. No. 5,708, 717, all of which are incorporated by reference in their entirety.

FIELD OF THE INVENTION

This invention relates to security documents and in particularly to a self-authenticating document system including the use of a synthetic paper material containing integral authentication and verification means.

BACKGROUND INFORMATION

To prevent unauthorized duplication or alteration of documents, frequently there is special indicia or a background pattern that may be provided for sheet materials such as tickets, checks, currency, and the like. The indicia or background pattern is imposed upon the sheet material usually by some type of printing process such as offset printing, lithography, letterpress or other like mechanical systems, by a variety of photographic methods, by xeroprinting, and a host of other methods. The pattern or indicia may be produced with ordinary inks, from special inks which may be magnetic, fluorescent, or the like, from powders which may be baked on, from light sensitive materials such as silver salts or azo dyes, and the like. Most of these patterns placed on sheet materials depend upon complexity and resolution to avoid ready duplication. Consequently, they add an increment of cost to the sheet material without being fully effective in many instances in providing the desired protection from unauthorized duplication or alteration.

Various methods of counterfeit-deterrent strategies have been suggested including Moire-inducing line structures, variable-sized dot patterns, latent images, see-throughs, barcodes, and diffraction based holograms. However, none of these methods employs a true scrambled image or the added security benefits deriving therefrom.

The inventor of the technology disclosed in this patent previously invented a system for coding and decoding indicia placed on printed matter by producing a parallax panoramagram image. These principles and embodiments of U.S. Pat. No. 3,937,565, issued Feb. 10, 1976 and are hereby incorporated by reference. The indicia were preferably produced photographically using a lenticular plastic screen (i.e. a lenticular screen) with a known spatial lens density (e.g. 69 lines per inch). A specialized auto-stereoscopic camera might be used to produce the parallax image such as the one described in this inventor's U.S. Pat. No. 3,524,395, issued Aug. 18, 1970, and U.S. Pat. No. 3,769,890, issued Nov. 6, 1973.

Photographic, or analog, production of coded indicia images has the drawback of requiring a specialized camera. Also, the analog images are limited in their versatility in that an area of scrambled indicia is generally noticeable when surrounded by non-scrambled images. Also, it is difficult to combine several latent images, with potentially different scrambling parameters, due to the inability to effectively re-expose film segments in generating the scrambled, photographic image. Furthermore, it is difficult to produce secure documents, such as currency, traveler's checks, stock and bond certificates, bank notes, food stamps and the like which are formed from a durable material resistant to tearing, staining, fraying, and deterioration from day-to-day contact.

Accordingly, a method and apparatus are needed whereby the photographic process and its results are essentially simulated digitally via a computer system and related software. Additionally, a system is needed whereby scrambled latent images can be integrated into a source image, or individual color components thereof, so that the source image is visible to the unaided eye and the latent image is visible only upon decoding. Also needed is the ability to incorporate multiple latent images, representing different "phases", into the source image for added security. Furthermore, what is needed is the ability to apply this technology to a durable substrate, such as a synthetic paper, and to incorporate an appropriate verification lens integral within the document's structure.

PRIOR ART

U.S. Pat. No. 5,811,493 teaches extrudable compositions comprising a thermoplastic polyester continuous phase, a thermoplastic polyolefin discrete phase, and a polyester-polyether, diblock, compatibilizer. Voided films made from the composition are also disclosed, having a paper-like texture and appearance.

U.S. Pat. No. 4,010,289 teaches a method of preparing synthetic resin film having high writability and printability which comprises the steps of (I) carrying out reaction by either of the following two processes: The process A of reacting together 1. alicyclic polybasic acid or anhydrides thereof, (2) polyepoxides containing at least two epoxy groups and (3) a compound selected from the group consisting of (a) unsaturated monobasic acid, (b) glycidyl compounds containing a radical polymerizable unsaturated bond and (c) unsaturated polybasic acid. The process B of reacting together 1. at least one compound selected from the group consisting of (a) polyepoxides containing at least two epoxy groups and (b) alicyclic polybasic acid or anhydrides thereof and (2) compounds containing vinyl and hydroxyl groups in the molecule; (II) mixing the unsaturated polyester compounds obtained in above process with fillers; (III) coating the mixture on the surface of synthetic resin film; and (IV) subjecting said coating to photopolymerization by irradiating ultraviolet rays.

U.S. Pat. No. 5,249,546 teaches the fabrication of a printer's convenience item which may be added to a volume such as a book, magazine, folder containing a stack of papers or the like. The convenience item provides a bookmark which projects away from a side page in the volume so that it may fold over edges of the pages to act as a bookmark. In some embodiments the base of the bookmark is wide enough to function as a thumb tab. Preferably, the book mark is made of a durable material such as a heavy duty paper or a plastic paper substitute.

U.S. Pat. No. 5,393,099 teaches a method of producing an anti-counterfeiting document or currency which acts and feels like existing paper currencies. The method laminates two sheets of currency paper on each side of a thin durable substrate film, thereby forming a durable document which maintains a paper-like feel. The currency exhibits unique and powerful anti-counterfeiting features. The currency also lasts significantly longer than conventional "paper" money.

None of the cited prior art references teach a secure document, for example paper money, which has been modified to contain both a particular scrambled indicia as a means of hidden authentication and an integral means for verifying the presence of said hidden indicia.

SUMMARY OF THE INVENTION

The present invention provides a durable and self-verifying secure document system and a method for its production. The secure document system is potentially useful for a wide variety of documents including, but not limited to, lottery tickets, especially probability game lottery tickets, currency, traveler's checks, passports, stock and bond certificates, bank notes, driver's licenses, wills, coupons, rebates, contracts, food stamps, magnetic stripes, test answer forms, invoices, tickets, inventory forms, tags, labels and original artwork.

Comparison of paper in general use prepared from pulp with recently developed synthetic resin film shows that pulp paper generally has lower tensile strength, dimensional stability and resistance to moisture, water corrosion and folding, than the latter. Synthetic resin films having high writability and printability have been marketed which eliminate the above-mentioned drawbacks of pulp paper. These synthetic resin films are often treated to enhance printability. These treatments include physical treatment processes such as those which sandblast, emboss and mat the surface of synthetic resin film, apply corona discharges to said surface or subject said film to high temperature treatment; ozone treatment processes, chemical treatment processes such as those which treat the surface of synthetic resin film with chemicals, for example, chlorine, peroxides, and mixed solutions of potassium chromate and concentrated sulfuric acid; and processes which coat said surface with high polymer compounds having a polar group such as polyvinyl alcohol, and carry out the graft polymerization of monomers having a polar group.

The instant invention is particularly durable when produced on one of the modern plastic paper substitutes. In one embodiment, a synthetic printing sheet sold under the trademark TESLIN by PPG Industries, Inc., may be utilized. The TESLIN material has the qualities of paper and is tough enough to survive very rough usage, such as that to which circulating currency is exposed. The base material is in the polyolefin family and can be adapted to a wide range of printing and fabricating techniques. It accepts a broad variety of inks and can be printed with offset, inkjet, screen, laser, and thermal transfer processes.

Another such material from which the secure documents of the instant invention could be manufactured is KIMDURA a synthetic paper, made by Kimberly-Clark Corporation, which is one of a variety of latex saturated durable papers produced by that corporation. These materials exhibit benefits in several critical areas including cost reduction. KIMDURA is a polypropylene film which is not only completely recyclable, but is so durable that it can be used for a long period of time. Other similar materials are sold under the trademarks PREVAIL, BUCKSIN, TEXOPRINT, TEXOPRINT II and DURAWEB, all of which are manufactured by the Kimberly-Clark Corporation. These materials represent durable paper substitutes which have been designed for unique applications involving toughness and aesthetic excellence. They retain the look, touch and feel of long lasting durable papers.

Still other materials which could be utilized include those sold under the trademarks ASCOT and TYVEK, both of which are products of DuPont Corp; the material sold under the trademark ASCOT is made from 100% polyolefin filaments randomly dispersed and bonded to provide paper-like properties. To this base sheet, a specially formulated coating is applied to assure high fidelity printing and to protect the filaments from the degrading effect of prolonged exposure to light. ASCOT requires the use of specially formulated ink containing no more than 3% volatile material to prevent swelling and distortion of the paper substitute material. High tack and viscosity inks are recommended to obtain even ink lay in solids and even tone in screen areas. ASCOT'S unusual features of strength, tear resistance, fold resistance, durability, water and light resistance and no grain direction, combined with its low weight to bulk ratio, make it well-suited for secure document applications.

Cellulose tear-resistant materials include the MASTER-FLEX brand of latex impregnated enamels providing high quality sheets are manufactured by Appleton. The material is a latex impregnated enamel providing a high quality sheet of paper substitute material which is formed on a fourdrinier machine with a unique makeup that enables the sheet to accept saturation process. After saturation, the web of Master-Flex material passes through squeeze rolls to remove excess saturants. Then, it is cured and dried. Double coaters apply the highly specialized coating, composed of clays, brighteners and adhesives, for producing a pinhole-free sheet. Supercalendered to a smooth, level surface with medium gloss finish, the MASTER-FLEX material is designed primarily for offset printing, offering good ink holdout. Quick-set inks are recommended for both offset and letterpress production. The surface accepts varnishes, lacquers and adhesives and converting operations, such as sewing, diecutting and perforating. A sheet of this material can be folded and refolded without cracking or flaking.

Other plastic paper substitutes or sturdy papers, paper boards, reinforced papers and reinforced paper substitutes, along with laminate composites including combinations of paper and non-paper materials are contemplated as suitable substrates for the secure documents disclosed herein. For convenience of expression all of these similar substrates will be identified as "plastic paper substitutes" in this specification and in the claims.

The authenticating scrambled indicia is associated with the plastic paper substitute's surface by a software method and apparatus for digitally scrambling and incorporating latent images into a source image. The latent image—in digitized form—can be scrambled for decoding by a variety of lenticular lenses as selected by the user, with each lens having different optical properties such as different line densities per inch, and/or a different radius of curvature for the lenticulars. Different degrees of scrambling might also be selected wherein the latent image is divided up into a higher multiplicity of lines or elements. For decoding purposes, the multiplicity of elements would be a function of the lens density.

The source image is then rasterized, or divided up into a series of lines equal in number to the lines making up the scrambled latent images. Generally, when hard copy images are printed, the image is made up of a series of "printers dots" which vary in density according to the colors found in the various component parts of the image. The software method and apparatus of the present invention, takes the rasterized lines of the source image and reforms them into the same general pattern as the lines of the scrambled latent image. Hence, where the source image is darker, the scrambled lines are formed proportionately thicker; where the source image is lighter, the scrambled lines are formed proportionately thinner. The resulting combined image appears to the unaided eye like the original source image. However, since the component rasterized lines are formed in the coded pattern of the scrambled latent image, a decoder will reveal the underlying latent image. Due to the high printing resolution needed for such complex scrambled lines, attempts to copy the printed image by electromechanical means, or otherwise, are most often unsuccessful in reproducing the underlying latent image.

As a result of this digital approach, several different latent images can be scrambled and combined into an overall latent image, which can then be reformed into the rasterized source image. This is achieved by dividing the rasterized lines into the appropriate number of images (or phases) and interlacing the phased images in each raster line element. Each individual latent image might be oriented at any angle and scrambled to a different degree, so long as the scrambling of each image is a functional multiple of the known decoder frequency. Alternatively, the grey scale source image might be divided up into primary component printing colors (e.g. cyan, magenta, yellow, and black, or CMYK; red, green, blue, or RGB). Single color bitmap formats might also be used for certain applications. A scrambled latent image, or a multi-phased image, could then be individually reformed into each component color. Upon rejoining of the colors to form the final source image, the decoder will reveal the different latent images hidden in the different color segments.

The present invention also allows the option of flipping each of the elements of the latent image after it has been divided or scrambled into its elemental line parts. As has been discovered by the inventor, this unique step produces relatively sharper decoded images when each of the elements is flipped about its axis by one-hundred and eighty (180) degrees. This same effect was achieved by the process of U.S. Pat. No. 3,937,565, and the cited stereographic cameras therein, through the inherent flipping of an object when viewed past the focal point of a lens. The flipped elemental lines are then reformed into the rasterized source image. While enhancing the sharpness of the latent image, the flipping of the elements has no adverse, or even noticeable, effect on the appearance of the final coded source image. Moreover, by combining two images consisting of one image where the elements are flipped and another where they are not flipped, the appearance of a spatial separation of the two images will occur upon decoding.

As needed, the source image might simply consist of a solid color tint or a textured background which would contain hidden latent images when viewed through the proper decoder. Such solid, tinted areas might frequently be found on checks, currency, tickets, etc.

Other useful applications might include the latent encoding of a person's signature inside a source image consisting of that person's photograph. Such a technique would make it virtually impossible to produce fake ID's or driver's licenses through the common technique of replacing an existing picture with a false one. Other vital information besides the person's signature (e.g. height, weight, identification number, etc.) might also be included in the latent image for encoding into the source image.

Still other useful applications might include, for example, the following: passports, currency, special event tickets, stocks and bond certificates, bank and travelers checks, anti-counterfeiting labels (e.g. for designer clothes, drugs, liquors, video tapes, audio CD's, cosmetics, machine parts, and pharmaceuticals), birth certificates, land deed titles, and visas.

It is an object of the instant invention to produce a security document or currency which acts and feels like existing paper currency, and exhibits unique and powerful anti-counterfeiting features including the incorporation of scrambled indicia authentication and integral verification.

It is a further the object of the present invention to create a document/currency substrate that will increase the average lifespan of the currency in circulation thereby reducing overall document/currency costs.

An additional objective of the present invention is to provide a counterfeit-deterrent method and apparatus, as implemented by a software program on a computer system, for producing scrambled or coded indicia images, typically in a printed form. The coded image can then be decoded and viewed through a special lens which is matched to the software coding process parameters.

A further objective of the present invention is to provide a counterfeit-deterrent method and apparatus, as implemented by a software program on a computer system, wherein a source image is rasterized, and the latent image is broken up into corresponding elemental lines, and the rasterized source image is reconstructed according to the coded pattern of the scrambled image.

Yet a further objective of the present invention is to provide a counterfeit-deterrent method and apparatus, as implemented by a software program on a computer system, wherein the source image is converted into a grey scale image for incorporation of a latent scrambled image.

Still another objective of the present invention is to provide a counterfeit-deterrent method and apparatus, as implemented by a software program on a computer system, wherein the grey scale source image is further separated out into its component color parts for possible incorporation of latent scrambled images into each component color part, with the parts being rejoined to form the final encoded source image.

A related objective of the present invention is to provide a counterfeit-deterrent method and apparatus, as implemented by a software program on a computer system, wherein the elemental lines of the scrambled image may be rotated or flipped about their axis as necessary, or as selected by the user.

A further objective of the present invention is to provide a counterfeit-deterrent method and apparatus, as implemented by a software program on a computer system, wherein the "single phased" the scrambled image consists of a first latent image which has been sliced and scrambled as a function of a user selected decoder density and scrambling factor.

Yet another objective of the present invention is to provide a counterfeit-deterrent method and apparatus, as implemented by a software program on a computer system, wherein the "two phased" scrambled image is sliced as a function of a user selected decoder density, and each slice is halved into two sub-slices, and the first and second latent images are alternately interlaced in the sub-slices, with each latent image scrambled by a user selected scrambling factor.

Still another objective of the present invention is to provide a counterfeit-deterrent method and apparatus, as implemented by a software program on a computer system, wherein the "three phased" scrambled image is sliced as a function of a user selected decoder density, and each slice is divided into three sub-slices, and the first, second, and third latent images are alternately interlaced in the sub-slices, with each latent image scrambled by a user selected scrambling factor.

Yet another objective of the present invention is to provide a counterfeit-deterrent method and apparatus, as implemented by a software program on a computer system, wherein an "indicia tint" is produced which is similar to a two phased SI, but with one source file, and every second sub-slice of the input image is the complimenter of the first sub-slice.

A further objective of the present invention is to provide a counterfeit-deterrent method and apparatus, as implemented by a software program on a computer system, wherein the source image consists of a solid color or tint pattern with the scrambled image incorporated therein, but the elemental lines are flipped only where a letter or object occurs in underlying latent image.

Still another objective of the present invention is to provide a counterfeit-deterrent method and apparatus, as implemented by a software program on a computer system, wherein the latent image is encoded directly into a certain visible figure on the source image, thus creating a "hidden image" effect.

Yet another objective of the present invention is to provide a counterfeit-deterrent method and apparatus, as implemented by a software program on a computer system, wherein a bitmap source image is used (instead of a grey scale image) to create hidden images behind single color source images or sections of source images.

Still another related objective of the present invention is to provide a counterfeit-deterrent method and apparatus, as implemented by a software program on a computer system, wherein a multilevel, 3-dimensional relief effect is created by applying different scrambling parameters to an image and its background.

Another related objective of the present invention is to provide a counterfeit-deterrent method and apparatus, as implemented by a software program on a computer system, wherein "void tint" sections might be produced and the word "void," or similar such words, would appear across documents if attempts are made to photocopy them.

Yet another possible objective of the present invention is to use the software program and computer system to produce the equivalent of "water marks" on paper products.

Still another possible objective of the present invention is to use the software program and computer system to produce, or to aid in producing, holographic images through line diffraction techniques.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 2(*b*) shows the scrambled "P" (above) of FIG. 9(*a*) with its resulting elements enlarged 400% (below) wherein the elements have not been flipped or altered.

FIG. 3 shows a "two phase" SI example of slicing the output image, wherein the width of the slice is one half of the one phase example, with every odd slice being from a 'source one' file, and every even slice being from a 'source two' file.

FIG. 4 shows a "three phase" SI example of slicing the output image, wherein the width of the slice is one third of the one phase example, with every third slice being from the same source input file.

DETAILED DESCRIPTION OF THE PREFERRED EMBODIMENT

Although the invention will be described in terms a specific embodiment with certain alternatives, it will be readily apparent to those skilled in this art that various modifications, rearrangements and substitutions can be made without departing from the spirit of the invention. The scope of the invention is defined by the claims appended hereto.

Scrambled Indicia (SI) is a registered trademark of Graphic Securities Systems Corporation and draws attention to a proprietary process which includes a process of rasterizing, or dividing up into lines, a source or visible image according to the frequency (or density) of a lenticular decoder lens. The number of lines is also a function of the scrambling factor, or zoom factor, as applied to a latent or secondary image. After the latent image is processed and scrambled, a set of scrambled or hidden lines exists which can then be combined into the rasterized lines of the visible image. The visible image is thus reformed, or re-rasterized, according to the pattern of the hidden latent image lines. Where the visible image is darker, the scrambled or hidden lines are made proportionately thicker in re-forming the rasterized lines of the visible image; similarly, where the visible image is lighter, the scrambled lines are made proportionately thinner. As a result, a new visible image is created, but with the encoded, latent, SI pattern being visible "underneath" when viewed through a transparent decoder lens.

Figure 1:
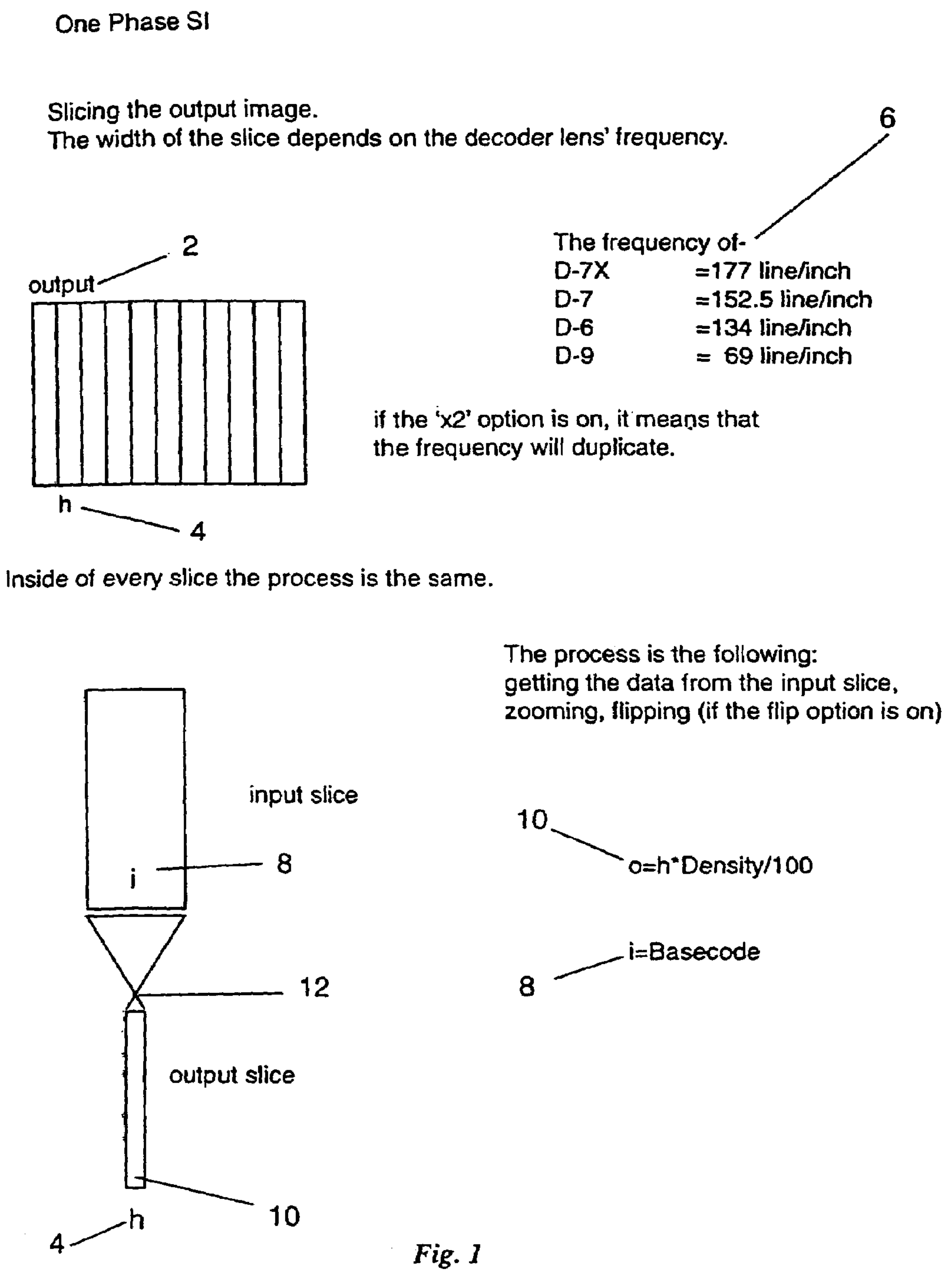
FIG. 1 shows a "one phase" example of the Scrambled Indicia (SI) process wherein an output image is sliced into elements as a function of the frequency of the decoding lens and the scrambling factor (or zoom factor, or base code) as selected by the user.

Referring now to FIG. 1, certain example details of the process are shown. In this example, one latent image is processed into a visible source image, and this process is generally referred to as a "one phase" SI operation. In any SI operation, an output image is a function of the decoder lens density. An output image 2 is shown which is sliced up into elemental slices, or segments, of width h. (See reference 4). Each slice width h is a function of several factors such as density and base code.

As for lens density, the inventor has assigned reference names to lenses with various frequencies (or line densities per inch), including for instance, the following: D-7X with 177 lines/inch; D-7 with 152.5 lines/inch; D-6 with 134 lines/inch; D-9 with 69 lines/inch. (see reference 6). The software for performing this process also provides an "x2" (or doubling factor, df) option which doubles the effective line density, and hence divides the output image up into twice as many slices. The resulting SI image will still be decodable by the selected lens because the number of lines is an even multiple of the frequency of the lens.

The output image slice, having width h, is processed as a function of the input slice width I (see reference 8). In turn, width I is a function of width h, the lens density, and a base code factor (or scrambling factor) as selected by the user.

These formulas are as follows:

df=2 (if "×2" selected); 1 (by default)

$o=h$*density/100 (See reference 10)

I=o*base code (B) (See reference 8)

Rearranging these formulas, the value for h becomes:

$$h = \frac{(1/b)*100}{\text{Density}*df}$$

Hence, as the value for the base code and/or the density is increased, the width h will decrease. A larger base code, or scrambling factor, therefore creates more lines and results in a more distorted or scrambled image.

Figure 2:
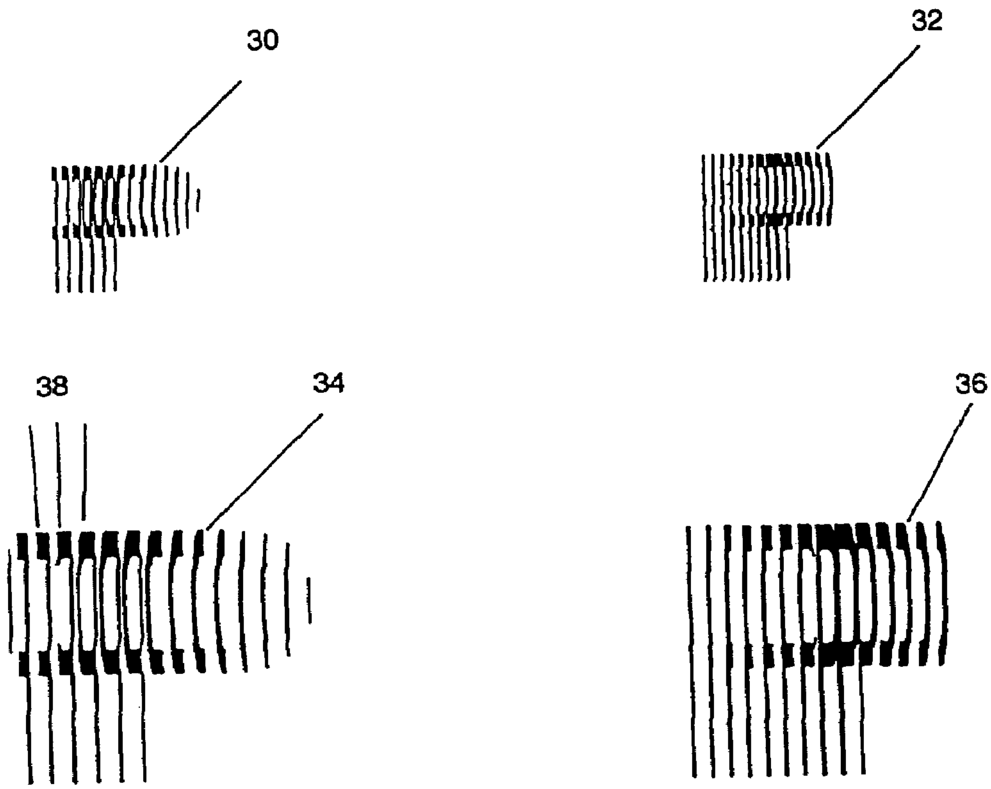
FIG. 2(*a*) shows a scrambled "P" (above) with its resulting elements enlarged 400% (below) wherein the elements have been flipped 180 degrees about their vertical axes.

Additionally, the SI process allows the option of flipping 12 the input slice to affect the sharpness of the image. Referring now to FIG. 2(*a*), the letter "P" is shown scrambled 30 according to the S.I. process. An image 34 enlarge by 400% further shows the characteristic elements 38. In this instance the elements have each been individually flipped 180 degrees about their vertical axis. FIG. 2(*b*) shows the same example "P" 32, and enlarged version 36 where the elements have not been flipped. When viewed through the proper decoder lens for these particular S.I. parameters, the flipped "P" will appear sharper, or more visually distinct, than the unflipped "P". For any scrambled image, the software provides the user the option of flipping or not flipping the elements, as further detailed below.

Referring now to FIG. 3, a "two phase" SI process is shown whereby the method is similar to that for the one phase SI. In this case, however, each slice of width h is further divided into a first and second sub-slice. The elemental lines of first and second scrambled images will be stored by the software program in 'source one' and 'source two' files. In the resulting output image, the odd slices 14 are composed of elemental lines from the source one file, and the even slices 16 are from the source two file. Upon decoding, the first and second scrambled images will appear independently discernable.

Referring now to FIG. 4, a "three phase" SI process is shown as similar to the one and two phase SI processes. In this case, width h is divided into three parts. The first, second, and third scrambled images are stored in three computer source files. In the resulting output image, every third slice 18, 20, and 22 comes from the same respective first, second, or third source file. Again upon decoding, the first, second, and third scrambled images will appear independently discernable.

Figure 5:
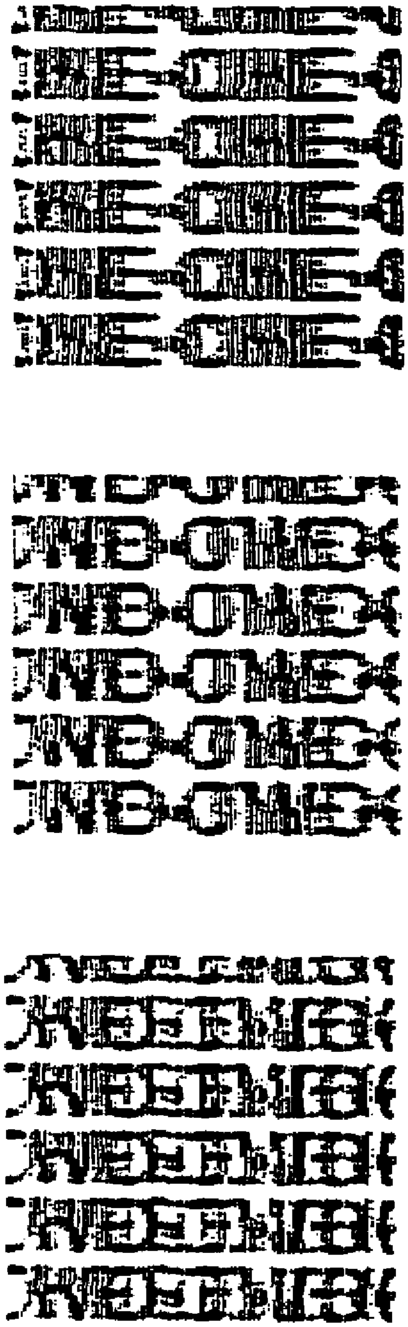
FIG. 5 shows a comparison of the one, two, and three phase scrambled and coded results.
Figure 6:
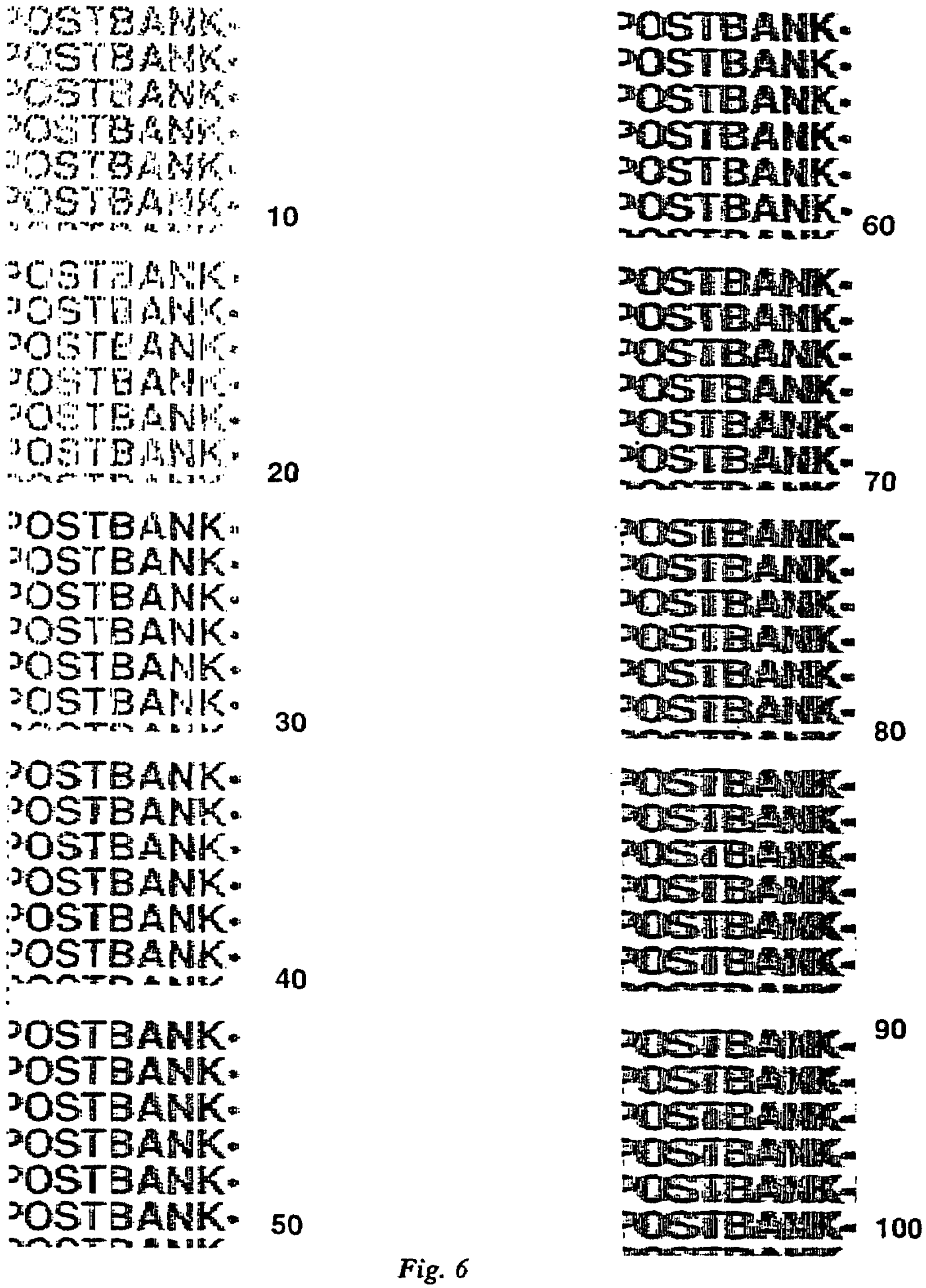
FIG. 6 shows a series comparison of scrambled images as a function of increasing lens frequency (or line density per inch) from 10 through 100.
Figure 7:
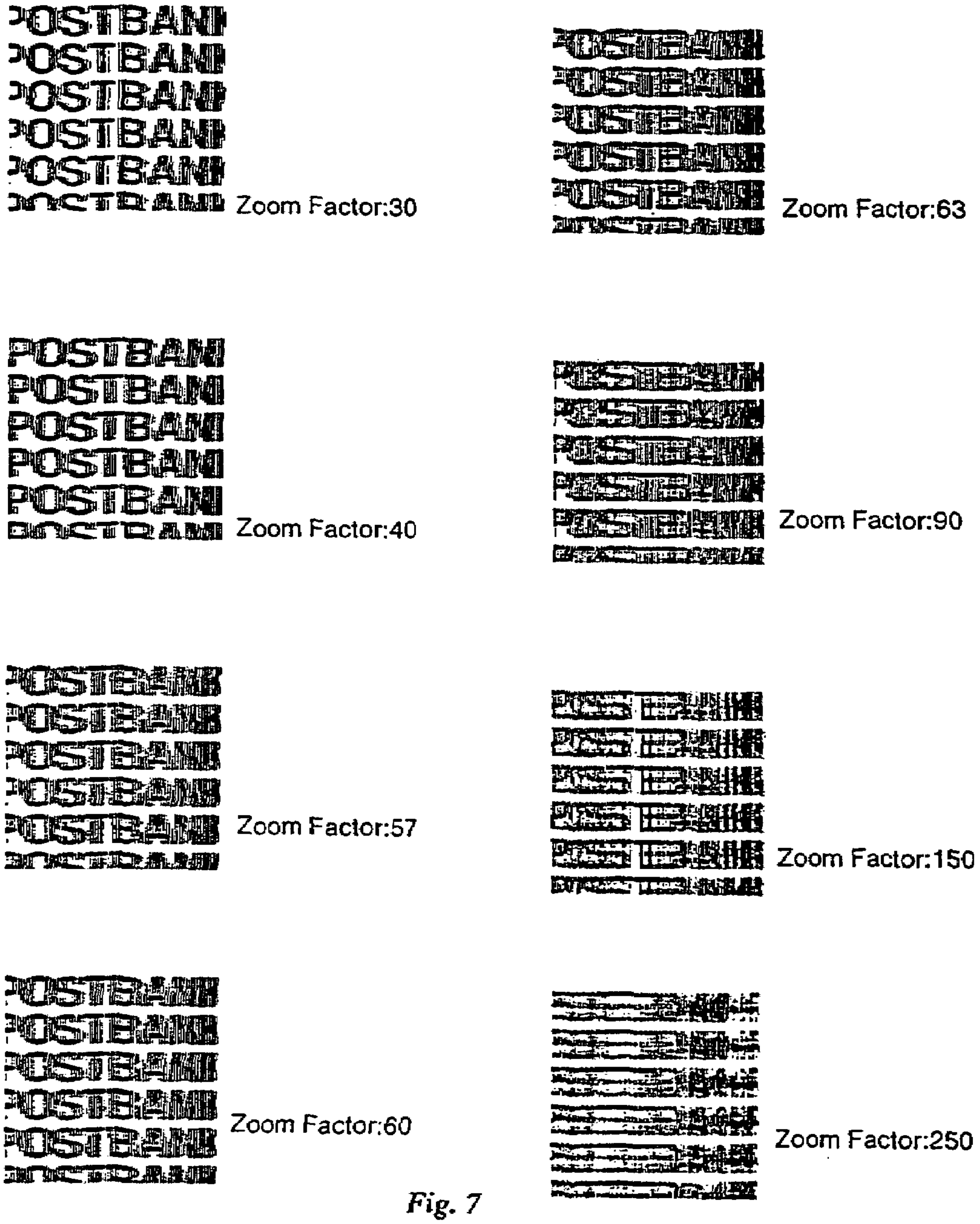
FIG. 7 shows a series comparison of scrambled images as a function of increasing zoom factor (or base code) ranging from 30 through 250, for a given lens frequency.

Referring to FIG. 5, a comparison is shown of the one, two, and three phase scrambled results for a given lens density and base code. FIG. 6 shows a comparison of the scrambled results for a given base code and a varying set of lens densities ranging from 10 through 100 lines per inch. As the lens density increases, the relatively width of each elemental line decreases and causes the scrambled image to be harder to discern. In FIG. 7, the lens density is fixed while the zoom factor, or base code, is increased through a series of values ranging from 30-250. Similarly as per the formulas above, as the base code is increased, the relative width of each elemental line decreases and causes the scrambled image to be harder to discern. As shown, the discernability of the scrambled image for a zoom factor of 30 is far greater than for a zoom factor of 250.

Figure 8:
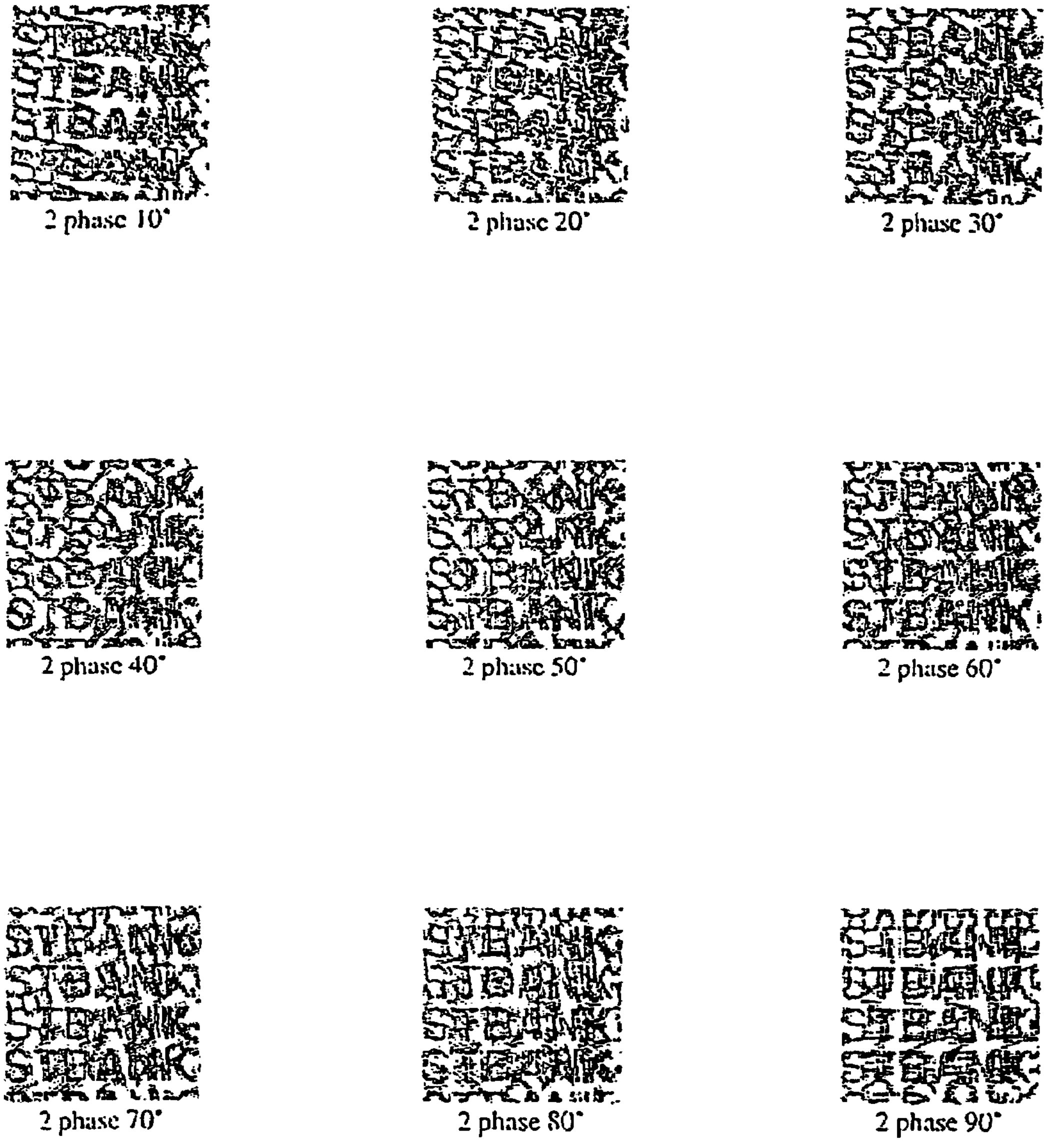
FIG. 8 shows a series comparison of two phased scrambled images wherein the first latent image and the second latent image are rotated with respect to each other ranging from 10 through 90 degrees.

Another benefit or feature of multiple phasing is that each latent image can be oriented at a different angle for added security. Referring now to FIG. 8, a series of two phase images is shown where the first latent image remains fixed and the second latent image is rotated, relative to the first image, through a series of angles ranging from 10-90 degrees.

Figure 9:
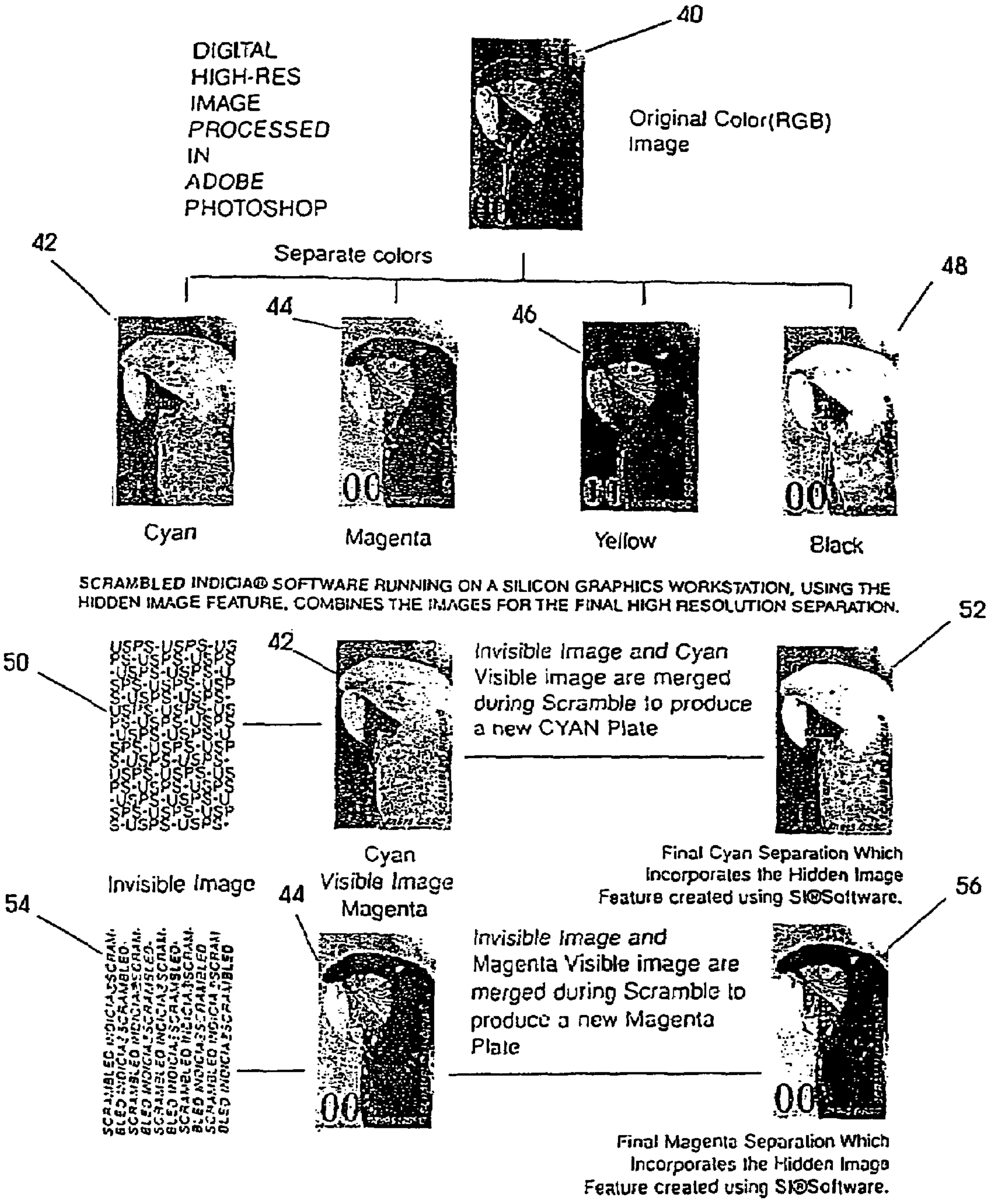
FIG. 9 shows the steps involved to encode, as hidden images, two separate scrambled indicia patterns into two separate base colors as extracted from the original source image.

Referring now to FIG. 9, an example of the versatility offered by a software version of the S.I. process is shown. In this example, a postage stamp is created whereby the S.I. process incorporates two different latent images, oriented 90 degrees to each other, into two different base colors of the visible source image. The visible source image—as comprised of its original RGB colors—is scanned, as a digital high resolution image, into a program such as ADOBE PHOTOSHOP. The image is then divided into its component color "plates" in yet another commonly used color format CMYK, wherein the component images of Cyan 42, Magenta 44, Yellow 46, and Black 48 are shown. The versatility of the S.I. software allows for the easy combination of a latent S.I. image with any one component color of the visible image. In this case, the latent invisible image 50 with the repeated symbol USPS is scrambled and merged with the Cyan color plate 42. The resulting Cyan color plate 52—as described above—will show the original visible image in a rasterized pattern to the unaided eye, but the latent invisible image will be encoded into the rasterized pattern. A second latent invisible image 54 with the repeated trademark SCRAMBLED INDICIA (of this inventor) is merged with the Magenta color plate 44 to produce the encoded Magenta image 56. The final visible image (similar to 40) will then be re-composed using the original Yellow and Black plates along with the encoded Cyan and Magenta plates.

The self authenticating document may include hidden indica customized to a particular need, including the currency of a country. In operation, a source image is first digitized and then divided out into its component CMYK colors. Each color plate can be independently operated on and typically includes a hidden image technique (or rasterization in single color). The target color plates are rasterized and the scrambling process applied to the latent images. The first latent image is merged with the rasterized Cyan color plate, the second image is merged with the rasterized Magenta color plate. The final output image is a created by re-joining the encoded Cyan and Magenta color plates with the unaltered Yellow and Black color plates. In this example, only the Cyan and Magenta colors were encoded. Other examples might choose to encode one color, three colors, or all four colors.

A useful application for the S.I. Rastering technique is where the visible image is a photograph and the latent image might be a signature of that person. Using the SIS program, the visible image can be rasterized and then the signature image can be scrambled and merged into the visible image raster pattern. The resulting encoded image will be a visible image of a person's photograph, which when decoded will reveal that person's signature. The latent image might include other vital statistics such as height, weight, etc. This high security encoded image would prove to be extremely useful on such items as passports, licenses, photo ID's, etc.

The processes described above have used line rastering techniques as derived from the suggested lenticular structure of the decoding lens. Other rastering techniques might also be used, which would be accompanied by corresponding decoder lenses capable of decoding such rastered and scrambled patterns.

Figure 10:
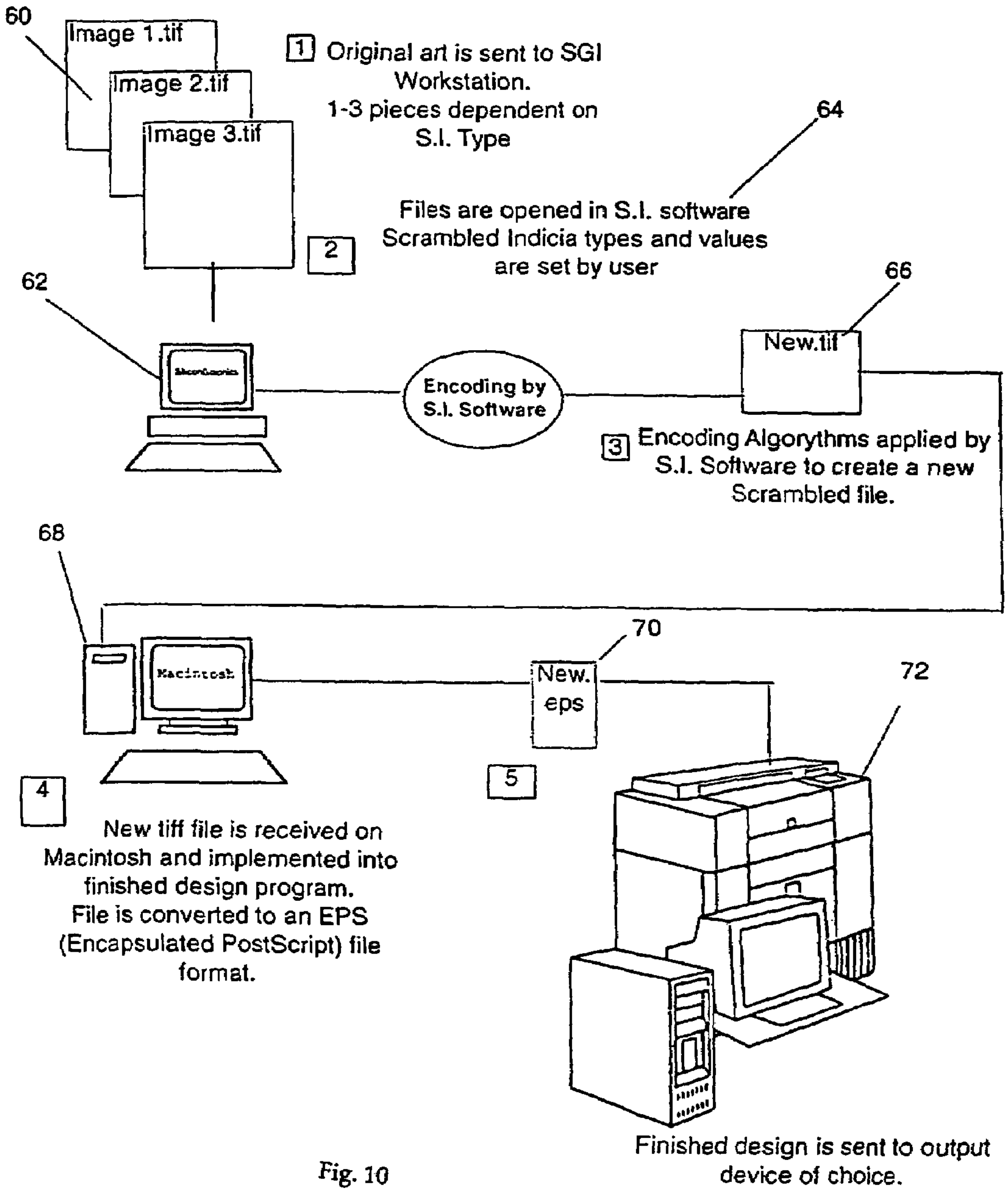
FIG. 10 shows an example hardware configuration for running the S.I. software and performing the SI process.
Figure 11:
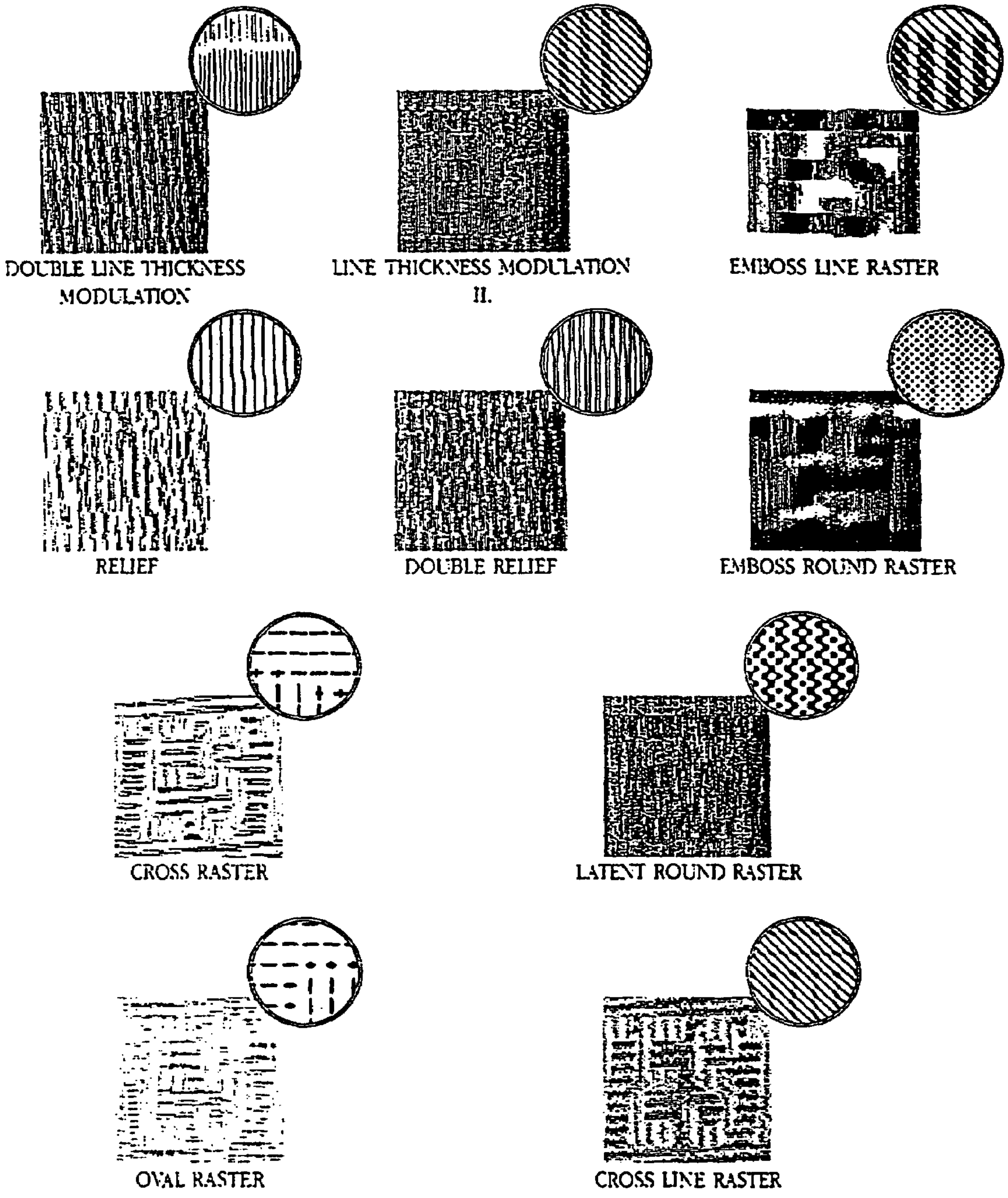
FIG. 11 shows examples of rastering techniques with the accompanying circles indicating an enlarged view of a portion of the overall pattern.

While this process might be implemented on any computer system, the preferred embodiment uses a setup as shown in FIG. 10. Various image files, as stored in "tif" format 60, are fed into a SILICON GRAPHICS INC. (SGI) workstation 62 which runs the software. While the software might run on any computer capable of handling high resolution graphics, the SGI machine is used because of its superior speed and graphical abilities. The files are opened by the S.I. software and the scrambled indicia types, values, and parameters are set by the program user 64. Encoding algorithms are applied by the software to merge latent images with visible images to create a new scrambled "tif" file 66. The new "tif" file is then fed into a MACINTOSH computer 68 for implementation into the final design program, wherein the file is converted into an Encapsulated PostScript (EPS) file format 70. The finished design is then sent to an output device of choice 72 which is capable of printing the final image with the resolution necessary to maintain and reveal the hidden latent images upon decoding. The preferred output device is manufactured by SCITEX DOLVE Referring now to FIG. 11, a series of example rastering techniques are shown which could similarly be used to encode scrambled images into rasterized visible source images. Accompanying each type of rastering is a circle showing an enlarged portion of the raster. The example types include: double line thickness modulation; line thickness modulation II; emboss line rastering; relief; double relief; emboss round raster; cross raster; latent round raster; oval raster; and cross line raster. Another technique, cross embossed rastering, might use one frequency of lens density on the vertical plane and yet another frequency on the horizontal plane. The user would then check each latent image by rotating the lens. Yet another technique would include lenses which varying in frequency and/or refractive characteristics across the face of a single lens. Hence different parts of the printed matter could be encoded at different frequencies and still be decoded by a single lens for convenience. Undoubtedly many other rastering types exist which are easily adaptable to the SIS encoding techniques.

Regardless of the type of rastering used, a variety of other security measures could be performed using the SIS program and the underlying principles involved. For instance, the consecutive numbering system found on tickets or money might be scrambled to insure further security against copying. The SIS program might also digitally generate scrambled bar encoding. A Method and Apparatus For Scrambling and Unscrambling Bar Code Symbols has been earlier described in this inventors U.S. Pat. No. 4,914,700, the principles of which are hereby incorporated by reference.

Yet another common security printing technique includes using complex printed lines, borders, guilloches, and/or buttons which are difficult to forge or electronically reproduce. The SIS program can introduce scrambled patterns which follow certain lines on the printed matter, hence the inventor refers to this technique as Scrambled Micro Lines.

The security of the Scrambled Indicia might be further enhanced by making 3 color separations in Cyan, Magenta, and Yellow of the image after the S.I. process has been performed. These colors would then be adjusted to each other so that a natural grey could be obtained on the printed sheet when the colors are recombined. The inventor refers to this process as "grey match." Hence, while the printed image would appear grey to the unaided eye, the decoded image would appear in color. The adjustment of the separations to maintain a neutral grey becomes yet another factor to be controlled when using different combinations of ink, paper, and press. Maintaining these combinations adds another level of security to valuable document and currency.

Still another possible use of the SIS program would be to create interference, or void tint, combinations on printed matter. This technique will conceal certain words, like "void" or "invalid" on items such as concert tickets. If the ticket is photocopied, the underlying word "void" will appear on the copy and hence render it invalid to a ticket inspector. The SIS software would provide an efficient and low cost alternative to producing such void tint patterns.

The SIS program might also be adapted to produce watermark-type patterns which are typically introduced to paper via penetrating oil or varnish. Furthermore, the SIS program might be applicable to producing holograms via line diffraction methods. Again, the SIS program would prove to be more efficient and cost effective for producing such results.

Figure 12:
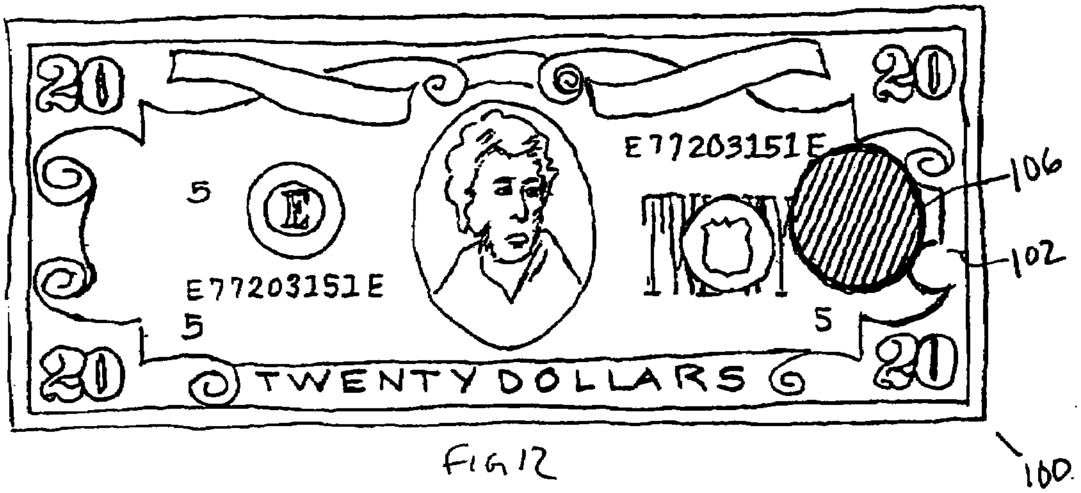
FIG. 12 is a pictorial view of a currency document containing integral verification means.
Figure 13:
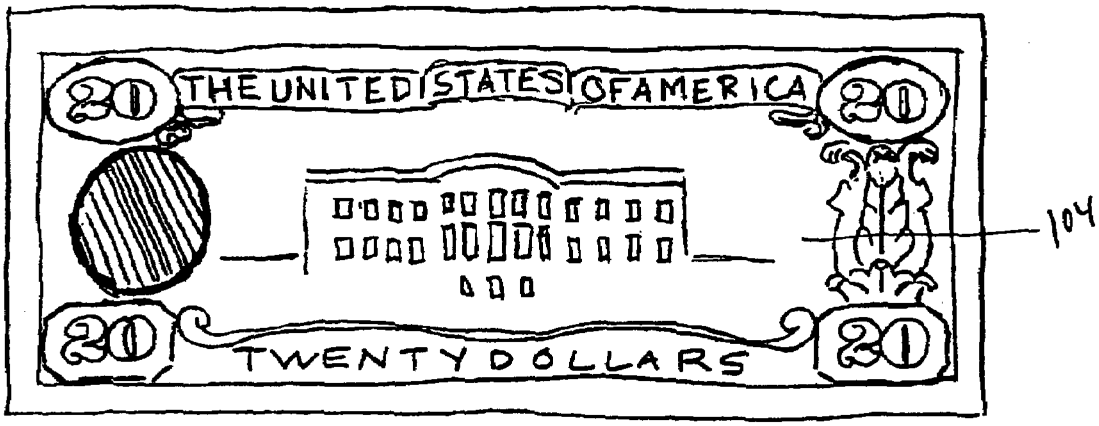
FIG. 13 is a rear view of FIG. 12.
Figure 14:
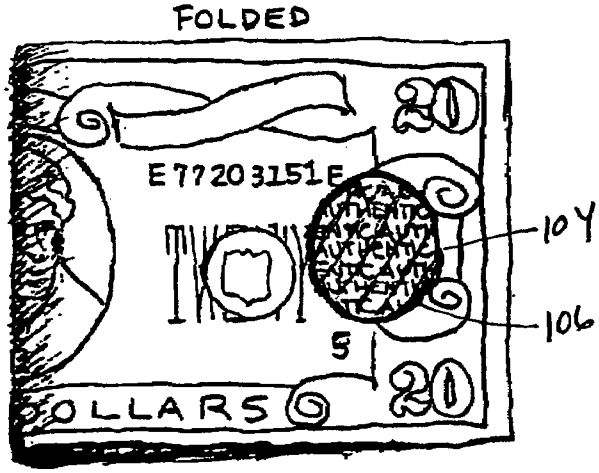
FIG. 14 illustrates FIG. 12 in a folded configuration to position the verification means juxtaposed the authenticating indicia.

Referring to FIG. 12, an example of a self-verifying secure document is illustrated. The secure document system is potentially useful for a wide variety of documents including, but not limited to, lottery tickets, currency, traveler's checks, passports, stock and bond certificates, bank notes, driver's licenses, wills, coupons, rebates, contracts, food stamps, magnetic stripes, test answer forms, invoices, tickets, inventory forms, tags, labels and original artwork. The currency depicted 100 consists of a plastic paper substitute 102 having various indicia 104 associated therewith including visible and hidden indicia. Application of the hidden indicia to the plastic paper substitute is implemented in accordance with the above captioned computer software program should customized indicia be employed or, in the example of currency, be typeset for large scale production. The document includes an integral lens area 106 which is particularly designed to verify the document's authenticity by rendering the hidden indicia visible to the viewer. The instant invention is particularly durable when produced on one of the modern plastic paper substitutes. The self-authenticating article 100 is based upon a plastic paper substitute adapted to retain various forms of indicia 104 with a means particularly adapted for revealing hidden indicia. The means defining an authenticating area forms a unitary and integral structure in combination with said plastic paper substitute. The authenticating area 106 is positionable in juxtaposed relation to the hidden indicia 104 thereby providing instant verification of the authenticity of the article. The self authenticating article may include the hidden indicia in one or more digitally produced latent images, each image being encoded in accordance with particular parameters with revelation of the hidden indicia achievable only by a particularly programmed authenticating lens.

The self authenticating article is formed from a plastic paper substitute selected from the group consisting of synthetic resin films having a high degree of writability and printability, laminate composite structures including combinations of paper and non-paper materials, latex saturated durable papers, coated polyolefin substrates formed from randomly dispersed and bonded polyolefin filaments, reinforced papers, and combinations thereof. The self authenticating article with the lens incorporated therein is especially suited for currency, stock certificates, bond certificates, special event tickets, tax stamps, official certificates, passports, bank and travelers checks, anti-counterfeiting labels, birth certificates, land deed titles, visas, food stamps, lottery tickets, driver's licenses, holograms, insurance documents, wills, coupons, rebates, contracts, test answer forms, invoices, inventory forms, and original artwork in juxtaposed relation to said hidden indicia thereby providing instant verification of the authenticity of said article.

The authenticating means is a optical viewing lens, such as a Fresnel lens, that can be inlaid, preformed, or produced by an intaglio engraving process. The self authenticating article may have one or more digitally produced latent images encoded in accordance with particular parameters of the decoder, whereby revelation of the hidden indicia is only achievable by a decoder of a particularly frequency.

Figure 15:
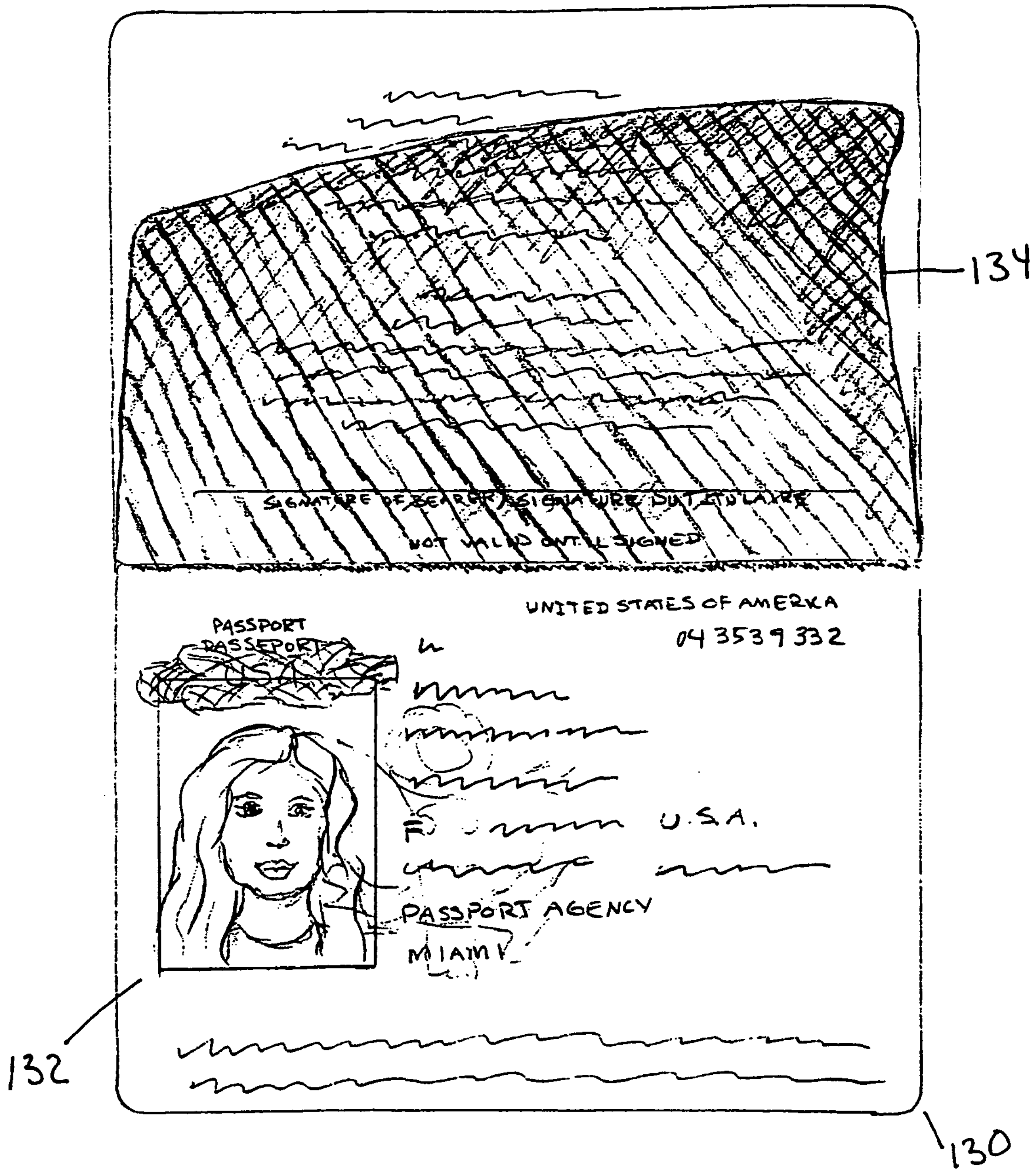
FIG. 15 is a pictorial view of a passport having a picture with hidden indicia and an optical viewing lens sized to follow the shape of the passport.
Figure 16:
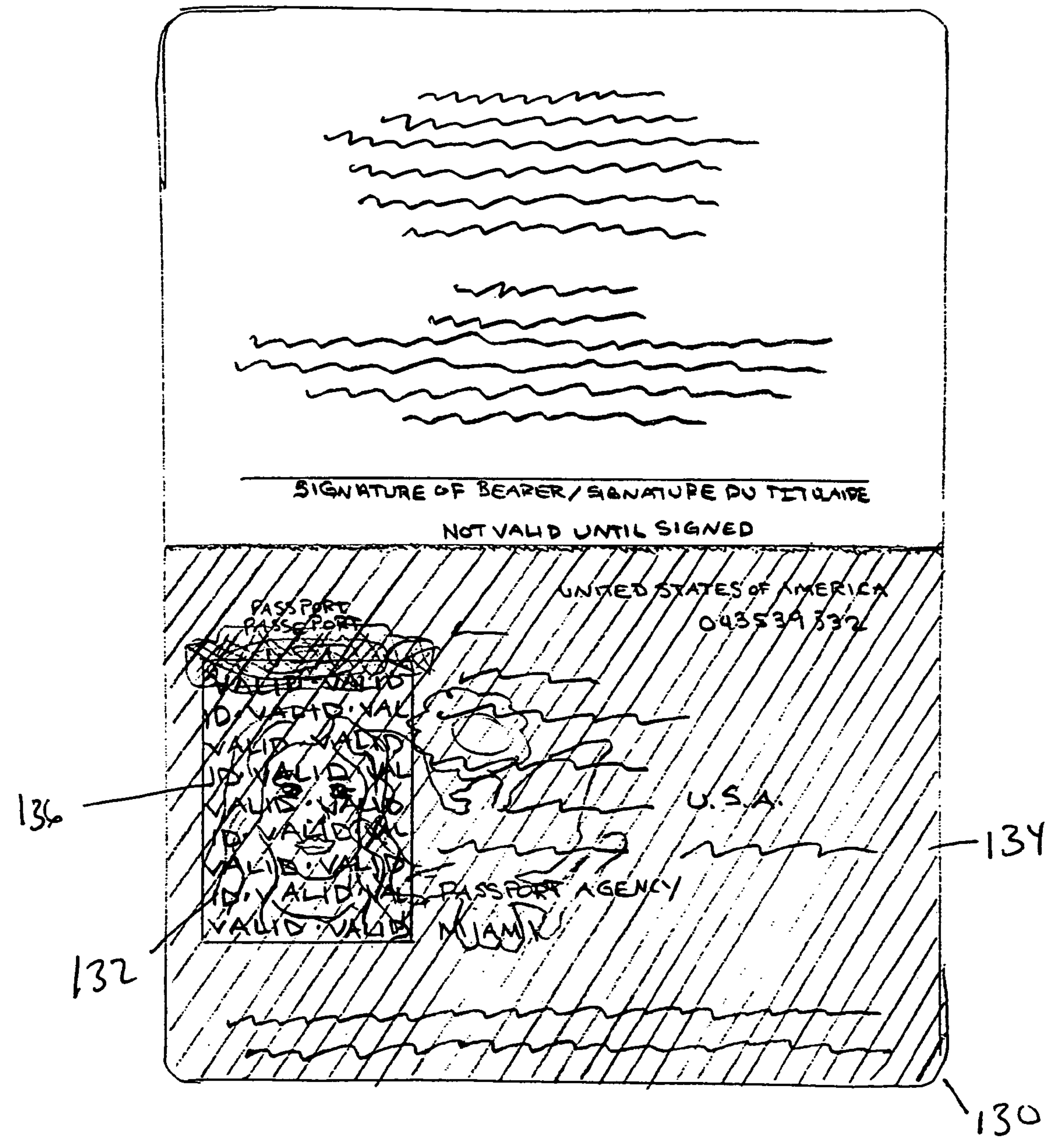
FIG. 16 is FIG. 15 with the optical viewing lens placed over the picture.

FIG. 15 is a pictorial view of a passport 130 having a picture 132 having hidden indicia placed therein. In this embodiment, the optical viewing lens 134 is sized to follow the shape of the passport 130. The lens 134 is formed of the sheet like material and is attached to the passport in a similar manner as the remaining pages. As shown in FIG. 16, the lens 134 is placed over the picture 132 for purposes of revealing the hidden indica 136.

Figure 17:
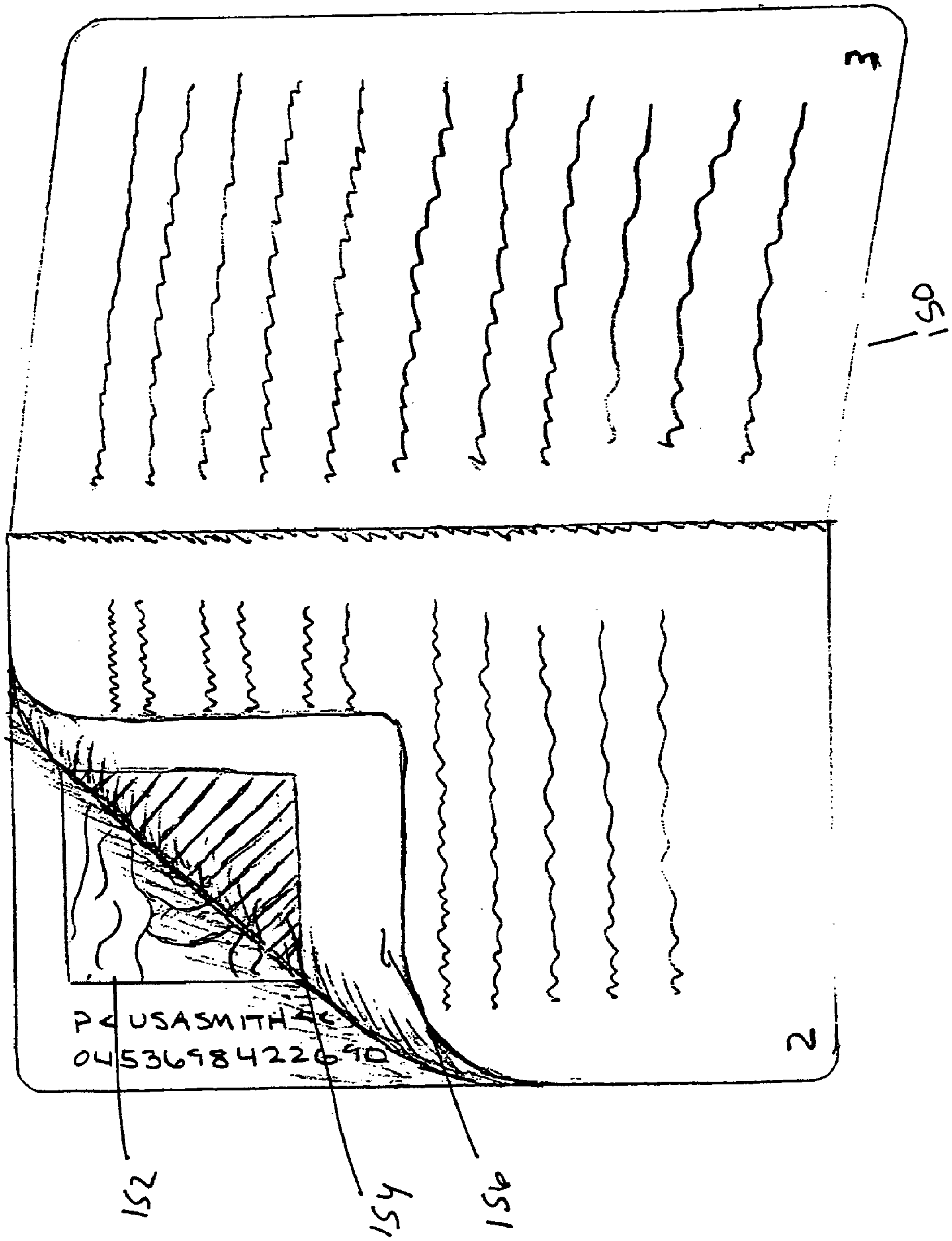
FIG. 17 is a pictorial view of a passport having a picture with indicia and optical viewing lens forming a window.
Figure 18:
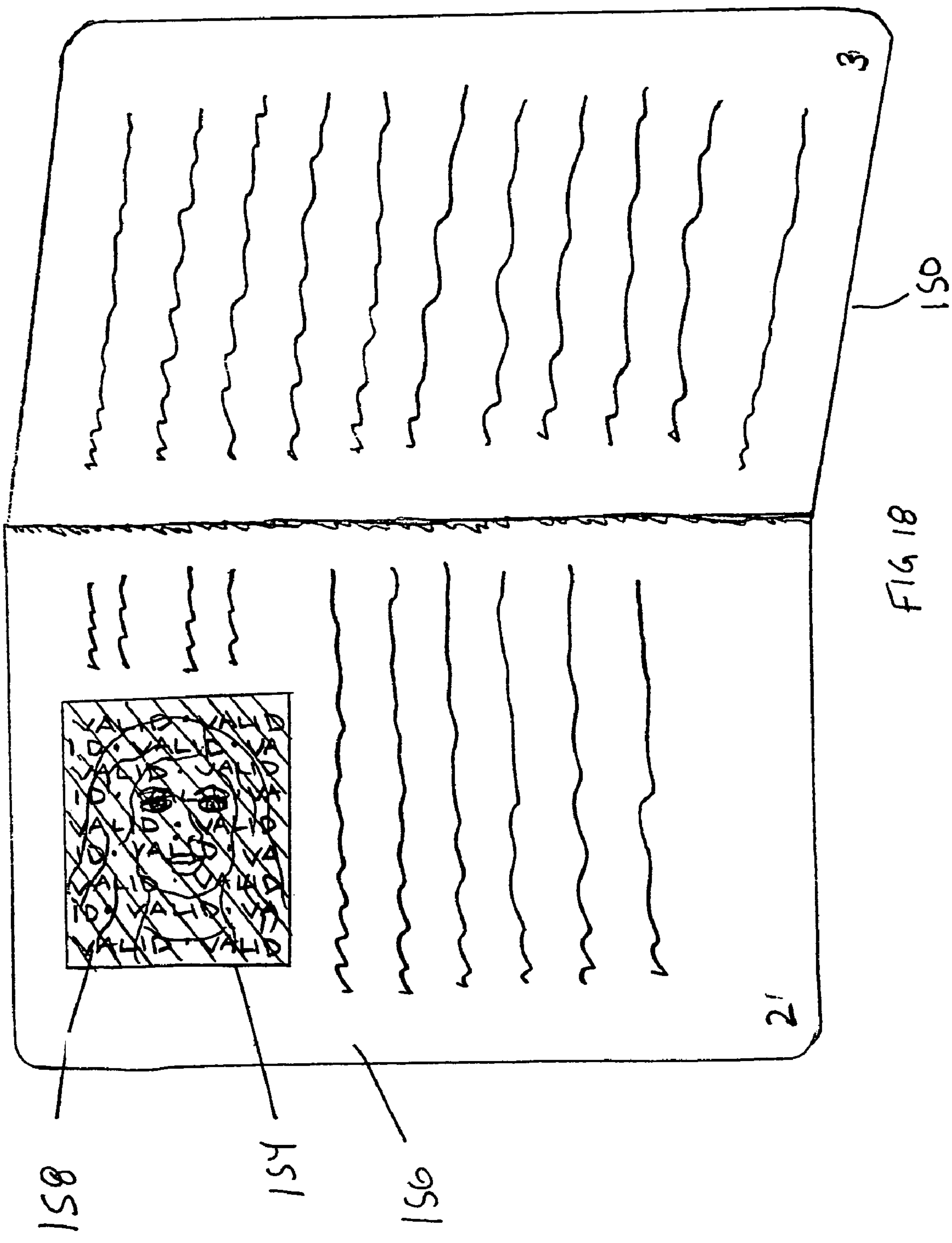
FIG. 18 is FIG. 17 with said optical viewing lens window placed over the picture.

In yet another example of this use, FIG. 17 depicts a pictorial view of a passport 150 having a picture 152 having hidden indicia placed therein. In this embodiment, the optical viewing lens 154 is formed integral to a passport sheet 156. As shown in FIG. 16, when the sheet 156 is placed over the picture 152, the lens 154 has been placed in an alignment position for purposes of revealing the hidden indica 158.

It is to be understood that while I have illustrated and described certain forms of my invention, it is not to be limited to the specific forms or arrangement of parts herein describe and shown. It will be apparent to those skilled in the art that various changes may be made without departing from the scope of the invention and the invention is not to be considered limited to what is shown in the drawings and described in the specification.

What is claimed is:

1. An article comprising:

a substrate having at least one printable surface portion;

a visible primary image printed onto the at least one printable surface portion of the substrate, the primary image having a hidden image embedded therein, the hidden image being formed with at least one graphic characteristic corresponding to a characteristic of an optical decoding device so that the hidden image can only be detected when viewed through the optical decoding device, wherein the article comprises a portion of packaging material.

2. An article comprising:

a substrate having at least one printable surface portion;

a visible primary image printed onto the at least one printable surface portion, the primary image having a hidden image embedded therein, the hidden image being formed with at least one graphic characteristic corresponding to a characteristic of an optical decoding device so that the change in the appearance of the primary image can only be detected when viewed through the optical decoding device, wherein the primary image is coded or otherwise divided into a plurality of image elements which are arranged with respect to each other and/or with respect to the optical decoding device such that the hidden image is not visible unless viewed through a decoding region of the optical decoding device.

3. An article according to claim 1, wherein the primary image comprises a plurality of image elements arranged in a grid or matrix.

4. An article according to claim 3, wherein a portion of the plurality of image elements are offset with respect to the matrix based on the content of the hidden image.

5. An article according to claim 4, wherein an optical device for viewing the hidden image is provided on another article.

6. An article according to claim 4, wherein an optical device for viewing the hidden image is provided on the same article on which the primary image is printed.

7. An article according to claim 6, wherein the primary image is provided on the same surface or an opposed surface of the article as the device.

8. An article according to claim 7, comprising a transparent substrate such as a film.

9. An article according to claim 5, wherein the two articles are arranged to lie permanently in registration by laminating or otherwise joining them together.

10. An article according to claim 2, wherein the primary image comprises a plurality of image elements arranged in a grid or matrix.

11. An article according to claim 10, wherein a portion of the plurality of image elements are offset with respect to the matrix of the main image based on the content of the hidden image.

12. An article according to claim 11, wherein an optical device for viewing the hidden image is provided on another article.

13. An article according to claim 11, wherein an optical device for viewing the hidden image is provided on the same article on which the primary image is printed.

14. An article according to claim 13, wherein the primary image is provided on the same surface or an opposed surface of the article as the device.

15. An article according to claim 14, comprising a transparent substrate such as a film.

16. An article according to claim 12, wherein the two articles are arranged to lie permanently in registration by laminating or otherwise joining them together.

17. An article according to claim 1, wherein the optical device comprises a grating or lens.

18. An article according to claim 2, wherein the optical device comprises a grating or lens.

19. An article containing a visible primary image printed onto a surface of the article, the primary image having a hidden image embedded therein, which hidden image can be detected when viewed through an optical device, wherein the primary image is coded or otherwise divided into a plurality of image elements which are arranged with respect to each other and/or with respect to the optical device such that the hidden image is not visible unless viewed through a descrambling or decoding region of the optical device.

20. An article according to claim 19, wherein the descrambling or decoding region of the optical device comprises a mark or template or optically variable elements or diffraction structures or louvers, which are complimentary to the primary image on the article bearing the hidden image, and which render the hidden image on the article visible when viewed through the descrambling or decoding region of the optical device when the two lie in registration.

21. An article according to claim 2, wherein the descrambling or decoding region of the optical device comprises a mark or template or optically variable elements or diffraction structures or louvers, which are complimentary to the primary image on the article bearing the hidden image, and which render the hidden image on the article visible when viewed through the descrambling or decoding region of the optical device when the two lie in registration.

22. An article containing a printed image with complex characteristics, the printed image comprising a visible primary image having a hidden image embedded therein, the appearance of which hidden image changes dependent upon the angle from which the article is viewed, wherein the article comprises a portion of packaging material.

23. An article according to claim 22, wherein the article includes an optical device such as a lens or grating superimposed on or integrated with the printed image such that the hidden image is viewed through or with the optical device.

24. An article according to claim 23, wherein the optical device comprises a printed grating which is permanently superimposed onto the complex printed image, and which provides for the hidden image to change according to the angle from which it is viewed.

25. An article according to claim 22, wherein changing of the hidden image includes the appearance and/or disappearance of the hidden image.

26. An article according to claim 23, wherein changing of the hidden image includes the appearance and/or disappearance of the hidden image.

27. An article according to claim 24, wherein changing of the hidden image includes the appearance and/or disappearance of the hidden image.

28. An article comprising:

a substrate having at least one printable surface portion;

a visible primary image printed onto the at least one printable surface portion of the substrate, the primary image having a hidden image embedded therein, the hidden image being formed with at least one graphic characteristic corresponding to a characteristic of an optical decoding device so that the hidden image can only be detected when viewed through the optical decoding device, wherein the article comprises any from the following: a label, a tape, such as a tear tape, a portion of filmic wrap, a box or carton, threads, identification documents or passports.

29. An article containing a printed image with complex characteristics, the printed image comprising a visible primary image having a hidden image embedded therein, the appearance of which hidden image changes dependent upon the angle from which the article is viewed, wherein the article may comprise any from the following: a label, a tape, such as a tear tape, a portion of filmic wrap, a box or carton, threads, identification documents or passports.

30. A method of packaging an article, the method comprising providing the article with first and second packaging portions, the first packaging portion bearing an hidden image which is visible only when viewed through the second packaging portion when the first and second packaging portions lie in registration, and superimposing the second packaging portion on the first packaging portion so that the two packaging portions lie in registration.

* * * * *